United States Patent [19]
Matsui

[11] Patent Number: 4,982,214
[45] Date of Patent: Jan. 1, 1991

[54] FOCUSING SCREEN

[75] Inventor: Hiroshi Matsui, Kanagawa, Japan

[73] Assignee: Canon Kabushiki Kaisha, Tokyo, Japan

[21] Appl. No.: 347,214

[22] Filed: May 4, 1989

[30] Foreign Application Priority Data

May 7, 1988 [JP] Japan .................................. 63-110671
Aug. 25, 1988 [JP] Japan .................................. 63-211512
Feb. 28, 1989 [JP] Japan .................................. 1-047967
Mar. 17, 1989 [JP] Japan .................................. 1-065634

[51] Int. Cl.$^5$ ............................................... G03B 3/00
[52] U.S. Cl. ........................................ 354/200; 350/127
[58] Field of Search ............... 354/199, 200, 201, 202; 350/126, 127, 128

[56] References Cited

U.S. PATENT DOCUMENTS 3,718,078  2/1973  Plummer ...................... 350/127 X
4,519,686  5/1985  Seki et al. ........................ 354/200

Primary Examiner—Brian W. Brown
Attorney, Agent, or Firm—Fitzpatrick, Cell, Harper & Scinto

[57] ABSTRACT

A focusing screen includes a regular array of a plurality of unit regions on an optically transparent substrate, and an irregular array of a plurality of minute patterns of at least two different sizes in convex or concave form on a surface of the substrate.

16 Claims, 11 Drawing Sheets

F I G. 17
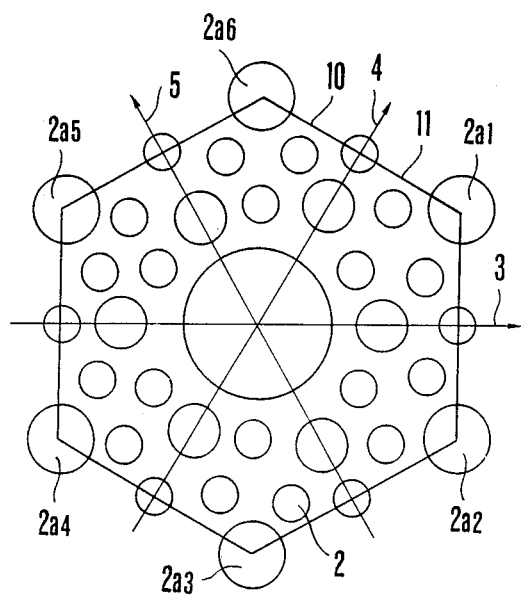
F I G. 18
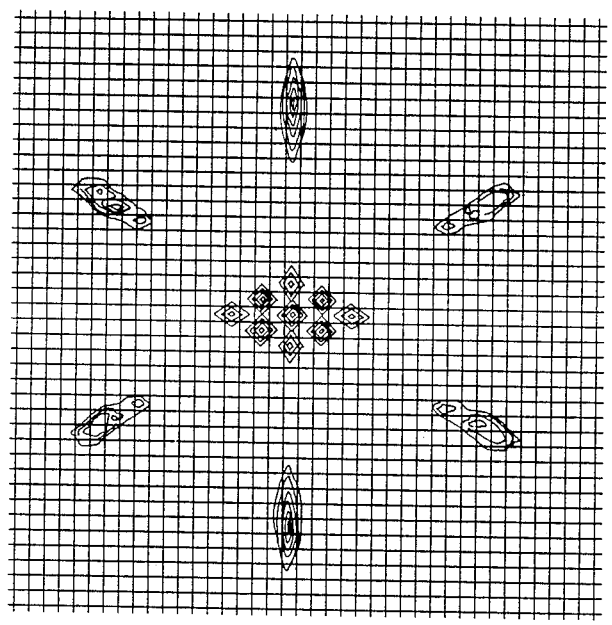

FOCUSING SCREEN

BACKGROUND OF THE INVENTION

1. Field of the Invention

This invention relates to focusing screens and, more particularly, to phase-type focusing screens suited to photographic cameras, and video cameras.

2. Description of the Related Art

There have been proposed focusing screens of the phase type in which on an optically transparent substrate a minute pattern comprised of a convex or concave portion is formed to a predetermined shape, a plurality of minute patterns are periodically arrayed in a unit region and a plurality of unit regions are regularly located in a rectangular form or triangular form.

For example, Japanese Laid-Open Patent Application No. Sho 55-9568 proposes a form of the phase-type focusing screen in which the minute patterns are round in shape and the same in size, and their array is regular and repetitive.

Besides this, in Japanese Laid-Open Patent Application No. Sho 62-269127, the minute patterns comprised of a convex or concave portion are regularly arrayed on the surface of the transparent substrate so that a phase difference is imparted to the passing light beam. Thus, the phase-type focusing screen has a desired diffusion characteristic.

The focusing screens proposed in these publications, because of the use of the relatively high periodicity in the array of the minute patterns, causes strong diffraction of light due to the wavelengths thereof. Therefore, chromatic blur appears when the image formed on the screen by the photographic system is blurred, and the diffracted light has an intensity distribution having peaks dispersively. The conventional phase-type focusing screens have difficulties in that blurring of the image projected thereon is lowered.

SUMMARY OF THE INVENTION

An object of the invention is to provide a focusing screen which has no chromatic blur and allows a luminous natural feeling to be obtained from the out-of-focus image so that it is easy to recognize.

The present invention makes use of an irregular array of a plurality of minute patterns each comprised of a convex and/or concave portion and formed to a predetermined shape in a unit region on an optically transparent substrate, and a plurality of the unit regions are located at a predetermined pitch. The pitch of the unit region and the shape of the minute patterns are properly set.

BRIEF DESCRIPTION OF THE DRAWINGS

FIG. 2, FIG. 4, FIG. 6, FIG. 9, FIG. 12, FIG. 15, FIG. 17, FIG 19 and FIG 21 are plan views showing respective focusing screens of the invention.

FIG. 3, FIG. 5, FIG. 7, FIG. 8, FIG. 10, FIG. 11, FIG. 13, FIG. 14, FIG. 16, FIG. 18, FIG. 20 and FIG. 22 are graphs showing respective diffusion luminous-intensity distributions according to the invention.

DETAILED DESCRIPTION OF THE PREFERRED EMBODIMENTS

Figure 1:
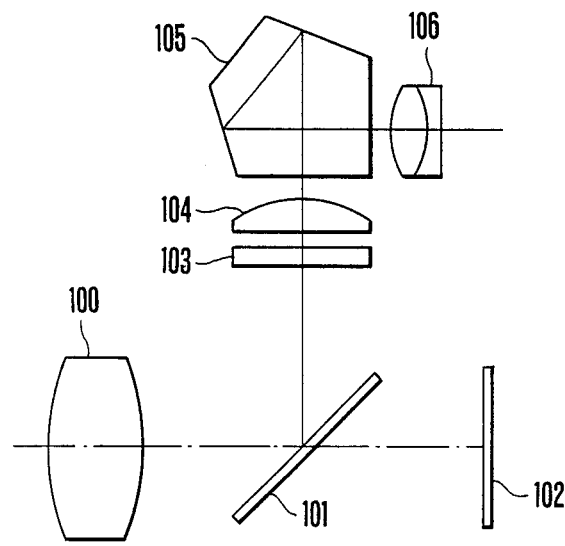
FIG. 1 is a longitudinal section view of a single-lens reflex camera.

FIG. 1 is a sectional view of a single-lens reflex camera in which a focusing screen according to the invention is arranged.

Reference numeral 100 denotes a photographic lens; 101 denotes a turnable mirror; 102 denotes a film plane; 103 denotes a focusing screen according to the invention arranged in a position conjugate to the film plane 102. 104 denotes a field lens. 105 denotes a pentagonal roof type prism. 106 denotes an eyepiece lens.

Figure 2:
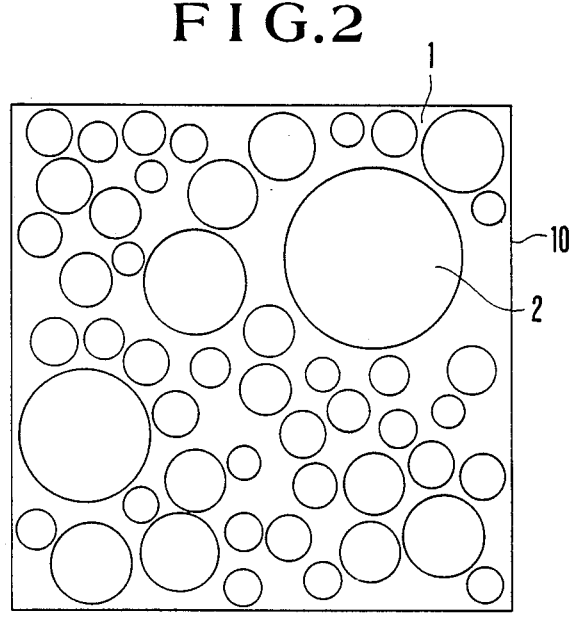
Figure 4:
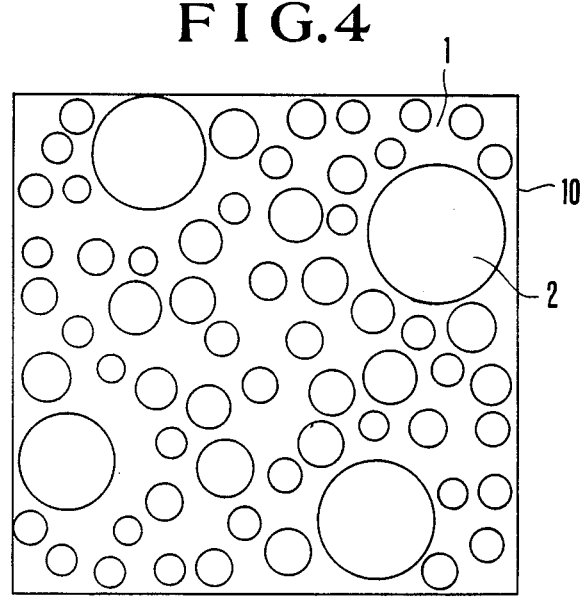

According to the invention, a focusing screen of the phase type is constructed with a plurality of unit regions 10 of a square shape shown in FIG. 2 and FIG. 4 located regularly in vertical, horizontal, right and left directions.

In FIG. 2 and FIG. 4, reference numeral 1 denotes an optically transparent substrate; 2 denotes a minute pattern of a circular shape comprised of a convex portion or a concave portion and made of the same material as that of the substrate 1. It should be noted that each convex portion or concave portion has a cross-section approximately rectangular in shape, and participates in no light refracting action but dominates a light diffracting phenomenon.

In the present embodiment, as shown in FIGS. 2 and 4, a plurality of (at least three) minute patterns 2 of a circular shape comprised of a convex portion or a concave portion whose sizes are different from each other are irregularly formed on the substrate 1, thus constituting the unit region 10.

Thus, a light beam that passes through the convex portion and another light beam that does not pass through the convex portion are given a predetermined phase difference, that is, a predetermined phase difference, so that light scattering is caused to take place. Therefore, a desired diffusion characteristic is obtained in the phase-type focusing screen.

In general, for the focusing screen to be used in the camera or the like, it is particularly desirable that the object image formed on it by the photographic system is luminous, and that the out-of-focus image has a blurred appearance. As to the focusing screen, therefore, it is important that these two features are maintained in good balance.

With this in mind, the present invention has a feature that on an optically transparent substrate a plurality of unit regions are regularly arranged in each of which a plurality of minute patterns of a predetermined shape comprised of a convex portion and/or a concave portion and made of the same material as that of the substrate are arranged so that positions and sizes of the plurality of minute patterns are irregular, wherein letting an area of each of the plurality of unit regions be denoted by SU, the total number of the plurality of minute patterns in each of the plurality of unit regions be denoted by ITL, areas of those of all the plurality of minute patterns in each of the plurality of unit regions which have the maximum and minimum spreads on a surface in an arrangement direction be denoted by SPMAX and SPMIN, respectively, an area of the i-th one of the plurality of minute patterns in each of the plurality of unit regions on the surface in the arrangement direction be denoted by SP(i), and defining $$\Delta SR = \left| \left( \sum_{i=1}^{ITL} SP(i) \right) / SU - 0.5 \right|$$

$$\Delta SP = (SP\text{MAX} - SP\text{MIN})/SU$$

the following conditions are satisfied:

$$0 \leq \Delta SR \leq 0.30 \qquad (1)$$

$$0.01 \leq \Delta SP \leq 0.25 \qquad (2)$$

In the invention, the minute patterns comprised of a convex portion or a concave portion are formed on the transparent substrate as has been described, and these minute patterns are formed so as to satisfy the inequalities of conditions (1) and (2), so that there is an advantage that characteristics of the focusing screen are maintained in good balance.

When the inequalities of conditions (1) and (2) are violated, it results either that, although the luminosity is sufficient as the focusing screen, discrimination between the sharpness and unsharpness of the object image is difficult to make, or conversely, that although the blurred appearance of the out-of-image focus is good, the view is too dark to observe. Thus, it becomes impossible to obtain excellent characteristics.

Also, in the present embodiment, to obtain a further improved focusing screen by means of properly distributing the diffusion characteristic of the focusing screen within a necessary angle range, the following feature is set forth:

$$0.0004 \leq \overline{SP} \leq 0.8 \qquad (3)$$

$$\text{where } \overline{SP} = \left( (1/ITL) \left( \sum_{i=1}^{ITL} SP(i) \right) \right)(1/SU).$$

The size of the minute pattern on the arrangement surface affects the angle of diffusion. The smaller that size, the larger the diffusion angle tends to become. When the diffusion angle is excessively large, the object image to be observed becomes much too dark. Conversely when it is excessively narrow, it results that although the luminosity becomes high, the out-of-focus state gets harder to discriminate. Either case is undesirable in the focusing screen.

The inequalities of condition (3) are set forth for a proper range of the size of the minute pattern on the arrangement surface. When this condition is satisfied, a good diffusion angle in regard to the focusing screen is obtained.

When the condition (3) is violated, it becomes objectionably difficult for the focusing screen to maintain the luminosity and the blurred appearance of the out-of-focus image in good balance.

In a specific embodiment, on the premise that the unit region is sized 100 μm×100 μm rectangular and the minute patterns contained in its interior are of a circular form, it is preferred that when the radius r of the circle is about 1 μm, the required total number is 2,000 or thereabout, or when the radius r is about 8 μm, it is about 20.

Also, in the characteristics of the focusing screen, particularly the luminosity may be excellently preserved. For this purpose, it is preferred that minute patterns whose radii r range from 7 to 13 μm are included.

It should be noted that in the present embodiment, the form of the minute pattern is not limited to the circular one, but the square form, triangular form, oval form and any other forms it may take.

It should also be noted that the cross-section of the convex portion or the concave portion is not limited to the rectangular form, but may be of a trapezoid form, a triangular form, an arcuate form, etc.

Numerical examples of first and second embodiments of the invention are shown below.

| (the First Embodiment) | (the Second Embodiment) |
| --- | --- |
| d = 37.5 μm | d = 40 μm |
| ΔSR = 0.049 | ΔSR = 0.17 |
| SR = 0.451 | SR = 0.33 |
| $\overline{SP}$ = 0.0090 | $\overline{SP}$ = 0.0052 |
| ΔSP = 0.106 | ΔSP = 0.057 | where d is a distance between adjacent two unit regions $$SR = \left( \sum_{i=1}^{ITL} SP(i) \right) / SU.$$

In the first and second embodiments shown in FIG. 2 and FIG. 4, a plurality of minute patterns of a circular shape whose positions and sizes (radii) are irregular are provided in the unit region of a square shape.

Figure 3:
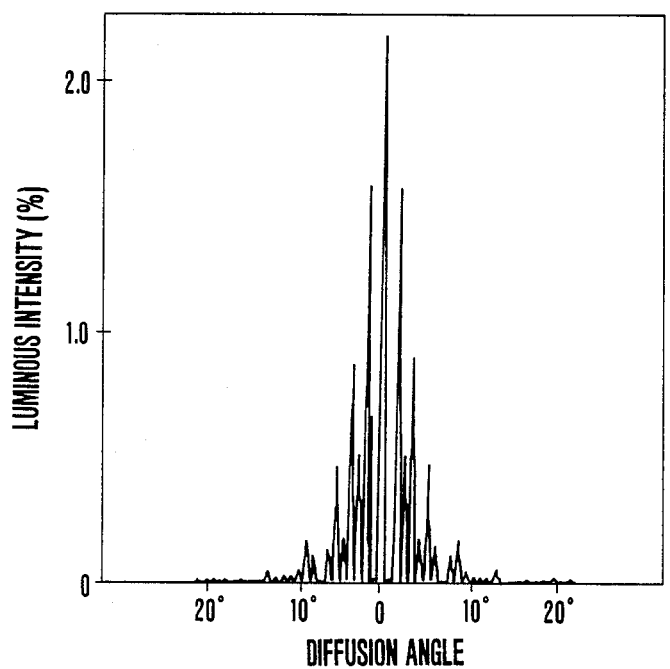

FIG. 3 is a diffusion characteristic curve of the phase-type focusing screen of the first embodiment where the ordinate represents the luminous intensity with the total emerging light amount taken at 100% and the abscissa represents the diffusion angle.

Incidentally, in the first embodiment shown in FIG. 2, the maximum one of the minute patterns of a circular shape contained in the unit region is 14 μm in diameter. In the case of using an acrylic resin (N=1.49) in making the phase-type focusing screen, for a desired wavelength λ=550 nm, the height Δ of the above minute pattern of a circular shape takes a value determined by the following formula:

$$\Delta = \lambda/2(N-1) \approx 0.56 \ \mu m$$

In the second embodiment shown in FIG. 4, the maximum one of the minute patterns of a circular shape is 11 μm in diameter and the height Δ thereof is likewise about 0.56 μm as in the first embodiment.

Figure 5:
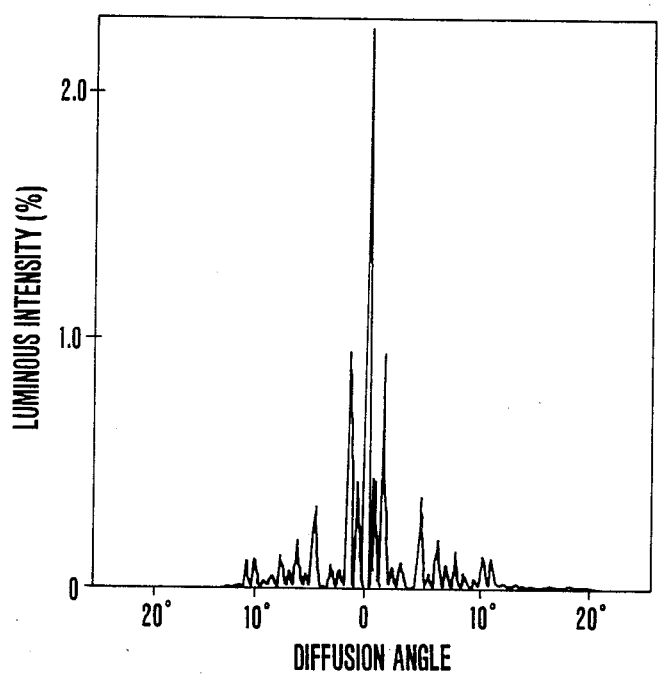

In FIG. 5 there is shown the diffusion luminous-intensity distribution of the phase-type focusing screen of the second embodiment.

Next, other embodiments (FIG. 6 to FIG. 14) of the invention are described. Here, with the number of minute patterns and their areas in mind, where:

SU . . . an area of the unit region;
ITL . . . the total number of the minute patterns contained in the unit region;
SP(i) . . . an area of the i-th one of the minute patterns in the unit region; and
ISNO . . . the number of minute patterns in which SP(i)/SU satisfies one of the following ranges:

when $SP(i)/SU \leq 0.025$, $0.1 \leq ISNO/ITL \leq 0.95$, (4)

-continued when $0.025 < SP(i)/SU \leq 0.05, 0 \leq ISNO/ITL \leq 0.70$, when $0.050 < SP(i)/SU \leq 0.100, 0 \leq ISNO/ITL \leq 0.30$, when $0.100 < SP(i)/SU, 0 \leq ISNO/ITL \leq 0.20$, and     (5)

$$0.4 \leq \left(\sum_{i=1}^{ITL} SP(i)\right)/SU \leq 0.6$$

are satisfied.

The significance of each of the inequalities of condition (4) and (5) for better accomplishing the object of the invention, is explained below. To obtain a good characteristics, the aforesaid minute patterns are classified in size to four groups, for which respective preferable numbers of minute patterns are defined. When the condition (4) is violated, the diffusion characteristic curve is objectionably distorted either to the lower order side (the small diffusion angle side) or to the higher order side (the large diffusion angle side).

The inequalities of condition (5) are to establish a good balance between the luminosity of the focusing screen and the blur characteristic. When this condition is violated, that fraction of the light amount which passes by is too large to achieve the good characteristic with ease.

Now, in the third embodiment according to the invention, the repetition pitch of the unit region is about 35 μm, and the factors in the aforesaid conditions have the following values:

when $SP(i)/SU \leq 0.025, ISNO/ITL = 0.46$, when $0.025 < SP(i)/SU \leq 0.05, ISNO/ITL = 0.46$, when $0.05 < SP(i)/SU \leq 0.10, ISNO/ITL = 0$, when $0.10 < SP(i)/SU, ISNO/ITL = 0.08$, and $$\left(\sum_{i=1}^{ITL} SP(i)\right)/SU = 0.50.$$

Figure 7:
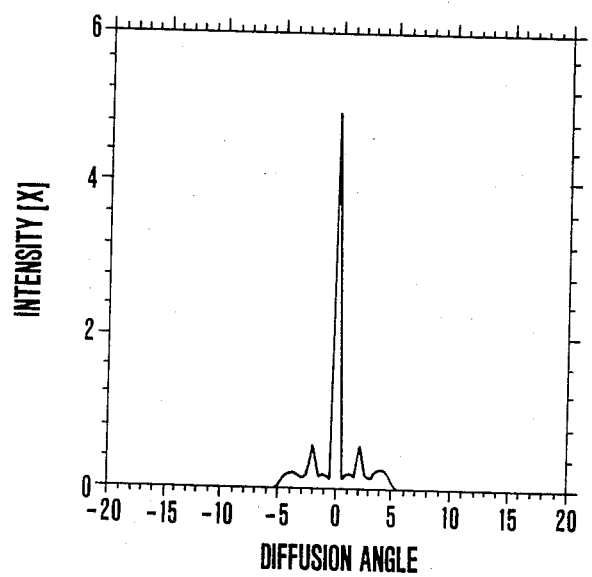

FIG. 7 shows the one-dimensional distribution of the diffusion characteristic of the phase-type focusing screen of the third embodiment, where the ordinate represents the luminous intensity with the total emerging light amount taken at 100% and the abscissa represents the diffusion angle.

Figure 8:
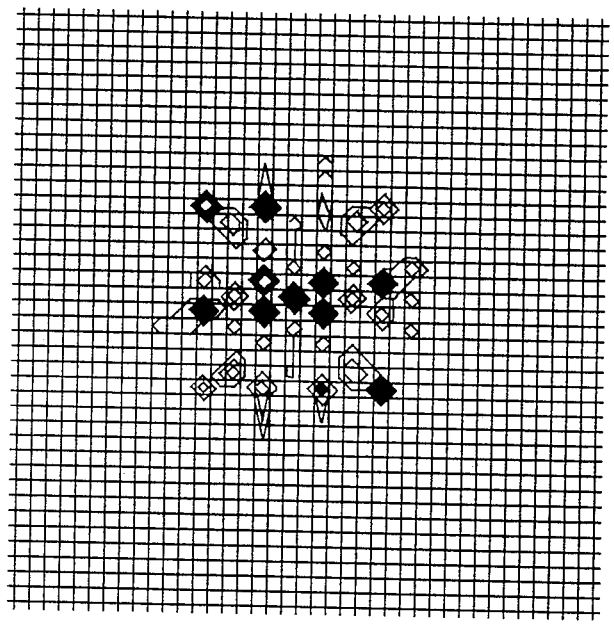

FIG. 8 shows the two-dimensional distribution of the diffusion characteristic of the third embodiment, where the mesh interval in FIG. 8 is about 0.5°.

Figure 6:
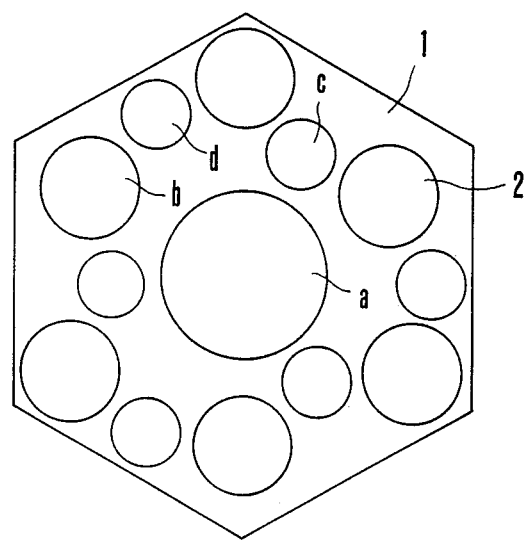

Incidentally, the maximum one of the circular minute patterns shown in FIG. 6 has a diameter of 13 μm. In the case of using an acrylic resin in making the focusing screen, a stage difference Δ inside that circular minute pattern as measured from a surface of the substrate is taken at Δ≈0.58 μm.

Figure 9:
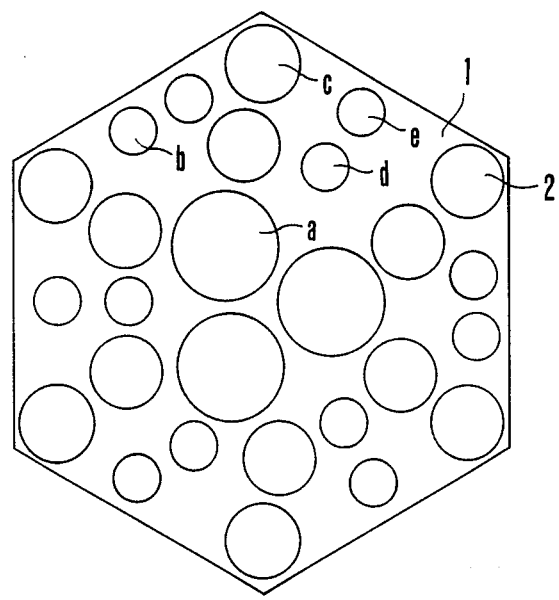

FIG. 9 illustrates a fourth embodiment of the invention, wherein a large number of circular minute patterns of five different sizes are irregularly arranged in a regular-hexagonal unit region of 25 μm in side length. The repetition pitch of the unit region is about 43 μm. The factors of the conditions (4) and (5) of the fourth embodiment have the following values:

when $SP(i)/SU \leq 0.025, ISNO/ITL = 0.89$,

-continued when $0.025 < SP(i)/SU \leq 0.05, ISNO/ITL = 0.11$, when $0.05 < SP(i)/SU \leq 0.10, ISNO/ITL = 0$, when $0.10 < SP(i)/SU, ISNO/ITL = 0$, and $$\left(\sum_{i=1}^{ITL} SP(i)\right)/SU = 0.50.$$

Figure 10:
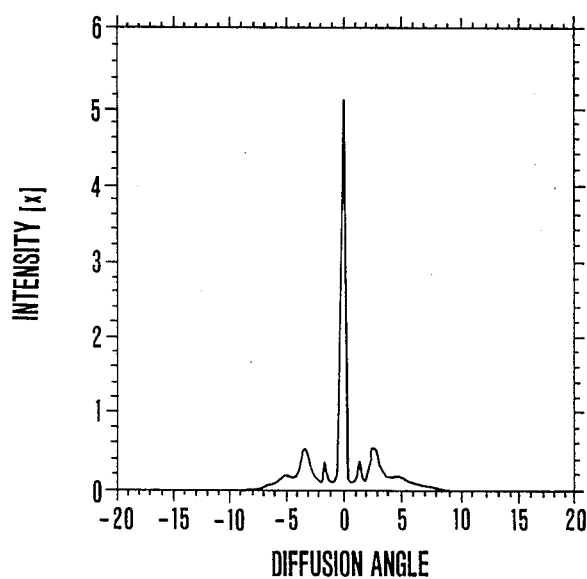
Figure 11:
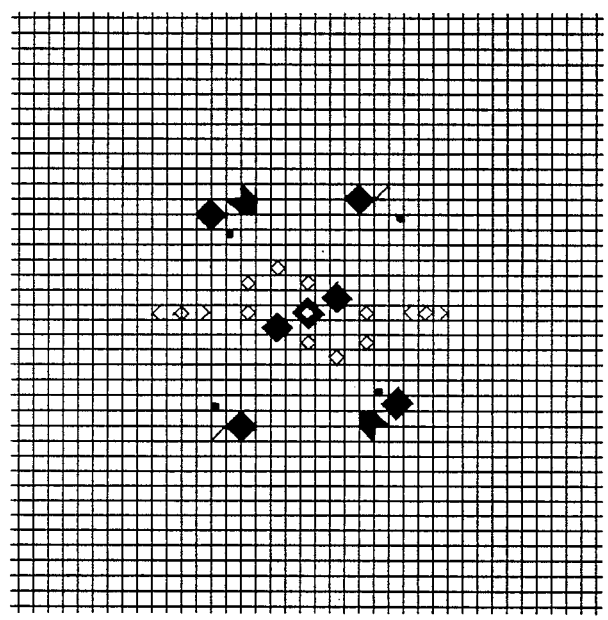

In FIG. 10 and FIG. 11, there are shown, respectively, one-dimensional and two-dimensional distributions of diffusion characteristic of the fourth embodiment. The mesh interval in FIG. 11 is about 0.4°.

Figure 12:
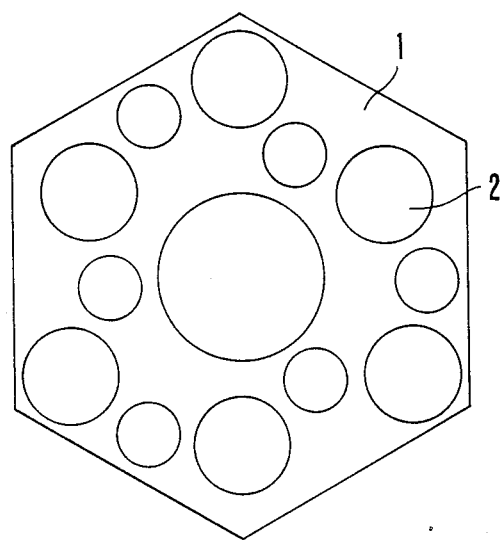

FIG. 12 illustrates a fifth embodiment of the invention, wherein a large number of circular minute patterns of five different sizes are irregularly arranged in a regular-hexagonal unit region of 15 μm in side length. The repetition pitch of the unit region is about 26 μm. The values of the factors in the fifth embodiment are as follows:

when $SP(i)/SU \leq 0.025, ISNO/ITL = 0.46$, when $0.025 < SP(i)/SU \leq 0.05, ISNO/ITL = 0.46$, when $0.05 < SP(i)/SU \leq 0.10, ISNO/ITL = 0$, when $0.10 < SP(i)/SU, ISNO/ITL = 0.08$, and $$\left(\sum_{i=1}^{ITL} SP(i)\right)/SU = 0.50.$$

Figure 13:
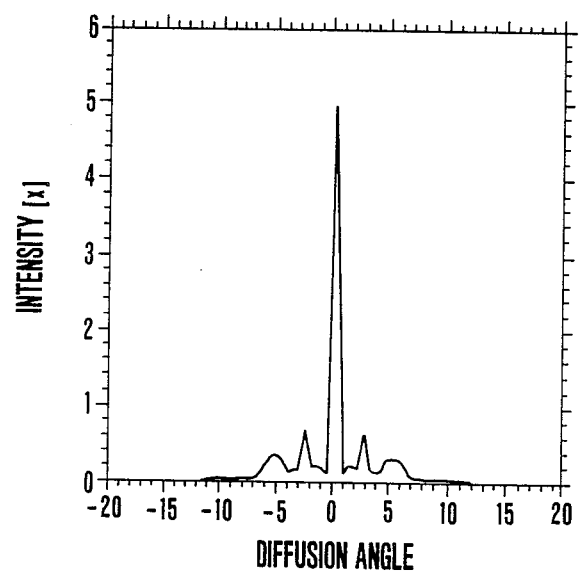
Figure 14:
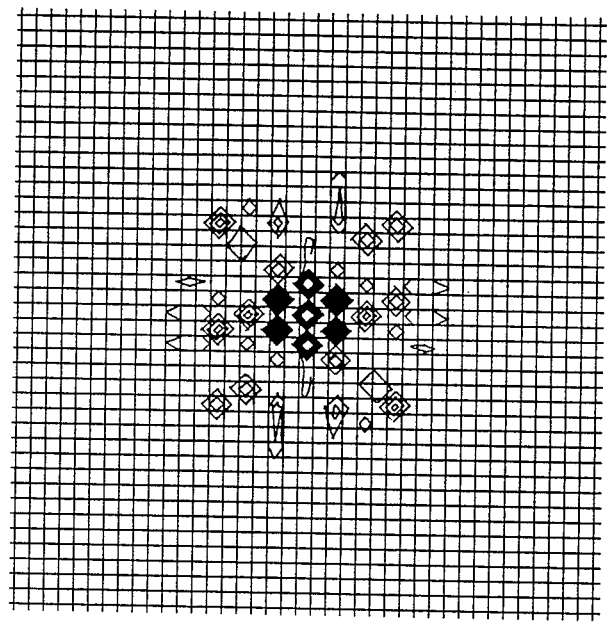

In FIG. 13 and FIG. 14, there are shown, respectively, one-dimensional and two-dimensional distributions of the diffusion characteristic of the fifth embodiment. The mesh interval in FIG. 14 is about 0.7°.

It should be noted that the repetition pitch P for the unit region according to the invention is desired to fall within a range of from 20 to 40 μm. When the pitch P is reduced from 20 μm, the color aberration starts to be conspicuous. When increased to more than 50 μm, on the other hand, the diffusion angle becomes so small that a sufficient blurred appearance is hardly obtained from the out-of-focus image.

In the next embodiment, on a surface of an optically transparent substrate a plurality of unit regions are regularly arranged in each of which a plurality of minute patterns of a predetermined shape comprised of a convex and/or concave portion and made of the same material as that of the substrate are irregularly arranged, wherein letting a center of gravity of a figure formed by virtual boundary lines between adjacent two of the unit regions be denoted by μG, a center of gravity of a figure on the surface of the substrate of one of the minute patterns be denoted by PG, a distance from the center μG to the center PG be denoted by ρ, one of angles which is smaller than 90° in absolute value made by a direction of the distance ρ with arbitrary one of repetition directions of the unit regions be denoted by θ, a repetition pitch of the unit regions be denoted by L, an average value of angles made by two of the repetition directions of the unit regions be denoted by θs, the total number of the minute patterns contained in each of the unit regions be denoted by M, and the number of the minute patterns contained within a range defined by the distance ρ and the angle θ be denoted by N, when $0 \leq \rho < 0.2L$, $0 \leq N/M \leq 0.3$, (6)

when $0.2L \leq \rho < 0.4L$, $0.1 \leq N/M \leq 0.8$, (7)

when $0.4L \leq \rho$, $0.2 \leq N/M \leq 0.9$, (8)

when $0 \leq \theta < 0.3\theta s$, $0 \leq N/M \leq 0.6$, (9)

when $0.3\theta s \leq \theta < 0.7\theta s$, $0.1 \leq N/M \leq 0.8$, (10)

when $0.7\theta s \leq \theta < 1.1\theta s$, $0 \leq N/M \leq 0.7$, and (11)

when $1.1\theta s \leq \theta$, $0 \leq N/M \leq 0.7$ (12)

are satisfied.

Figure 15:
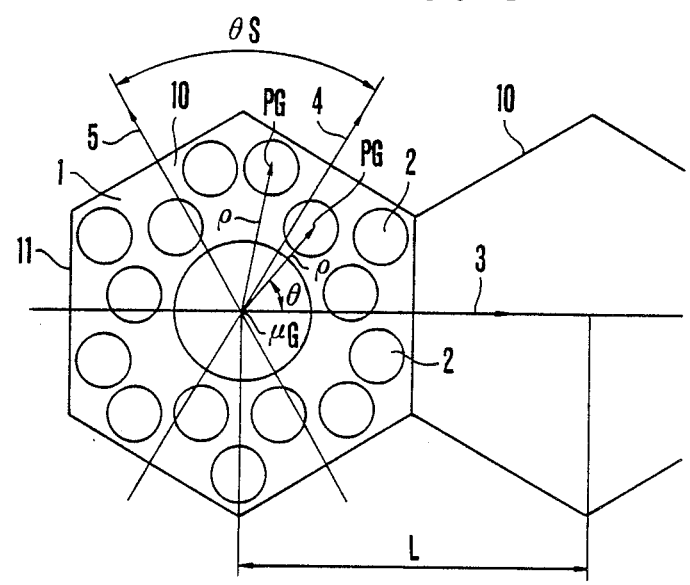

FIG. 15 and FIG. 17 are plan views of the interiors of the unit regions 10 of sixth and seventh embodiments of the invention, respectively. The phase-type focusing screen according to the invention is constructed as shown in FIG. 15 or FIG. 17 by a regular arrangement of a plurality of hexagonal unit regions 10.

In FIG. 15 and FIG. 17, reference numeral 1 denotes an optically transparent substrate, and 2 denotes a minute pattern of a circular shape comprised of a convex or concave portion and made of the same material as that of the substrate 1. The minute patterns 2 are irregularly arranged in the unit region 10. The unit regions 10 are repeated one after another along three directions 3, 4 and 5. Reference numeral 11 denotes virtual boundary lines between the unit regions 10.

$\mu$G is a center of a figure of the unit region 10; PG is a center of a figure of the minute pattern 2 on a surface of the substrate 1; $\rho$ is a distance from the center of gravity $\mu$G to the center of gravity PG; $\theta$ is one of angles whose absolute value is smaller than 90° made by a direction of the distance $\rho$ in the unit region with an arbitrary one of repetition directions of the unit regions 10; L is a repetition pitch of the unit regions 10; $\theta$s is an average value of angles made by two of the repetition directions of the unit regions as these angles differ from one another. It should be noted in connection with the total number M of the minute patterns contained in each of the unit regions that if there are some minute patterns across the boundary, for example, those shown in FIG. 17 by $2a_1$ to $2a_6$, these minute patterns $2a_1$ to $2a_6$ are made to be included in the total number. This rule applies also applied to the aforesaid number N.

In the present embodiments, as shown in the drawings, a plurality of circular minute patterns 2 comprised of a convex or concave portion are irregularly arranged on a surface of the substrate, thereby constituting a unit region 10.

At this time, the unit region 10 and the minute patterns 2 to be set in that unit region are specified by satisfying the conditions (6) to (12) defined above. Thus, the proper effects in regard to the focusing screen are brought into full play.

In other words, a light beam which passes through the convex portion of the minute pattern and another light beam which does not pass through that are given a predetermined phase difference therebetween, that is, a predetermined phase difference is established therebetween to give rise to appearance of diffraction and light scattering. By this, a phase-type focusing screen having a desired diffusion characteristics is obtained.

In the focusing screens for use in cameras or the like, it is generally required in particular that when observing the object image formed by the photographic system, the luminosity of that object image is high and that a good blur feeling is obtained from the out-of-focus image. It is, therefore, of great importance to find out a method of allowing the focusing screen to maintain good balance of these two features.

This combined feature is usually evaluated by what angle range and to what extent the light beam incident on the focusing screen diffuses to, in other words, by the diffusion characteristic curve of the focusing screen.

On this account, the present invention sets forth the inequalities of conditions (6) to (12) for formation of the minute patterns comprised of a convex or concave portion on the transparent substrate. When these conditions are satisfied, maintenance of an excellent balance of the characteristics of the focusing screen is attained.

The conditions (6) to (8) aim that while the light amount of each diffraction order are not one-sided over the necessary diffusion angle range, the intensity of the diffused light is continuously distributed. When this numerical range is exceeded, the diffused light distribution is distorted so that the unevenness of the intensity of light in the out-of-focus image and the color stains are apt to be appreciably undesirable.

The other conditions (9) to (12) are necessary to keep the two-dimensional diffused light distribution in uniformity. When this numerical range is exceeded, the degree of unsharpness of the image differs from place to place so that the image to be observed becomes objectionably unnatured.

To achieve a further improvement of the features of the focusing screen, it is preferred that the diffusion characteristic becomes such that the light intensity is continuously distributed within a range up to 5° or 6° on either side of the line in which the light beam enters as the reference line. On this account, in the present embodiments, a large number of minute patterns of more than three different sizes or shapes are formed in each unit region. By this, a finder image of reduced color aberration which, when out of focus, permits a natural blurred appearance to be obtained is made possible to observe.

Also, in the present embodiment, the repetition pitch of the unit regions is preferably more than about 20 $\mu$m. This contributes to a reduction of the bad influence of similar color aberration and others to those described above when the focusing screen is produced.

In the following, there are shown examples of specific focusing screens in the present embodiments.

In the sixth embodiment shown in FIG. 15, the unit region defined by the virtual boundary lines between it and any of its adjacent unit regions has a regular-hexagonal form with its one side of 20 $\mu$m long. The maximum possible number of directions in which the unit regions are repetitively located, is three as shown by directions 3, 4 and 5. The repetition pitch L and the average value $\theta$s of angles of the repetition directions are set at:

$L \approx 34.64 \mu m$, and $\theta s = 60$ degrees

The shape of each of the minute patterns in the present embodiment is circular. Of these minute patterns, the minimum one has a diameter of 5.2 $\mu$m, and the maximum one has a diameter of 14 $\mu$m.

Figure 16:
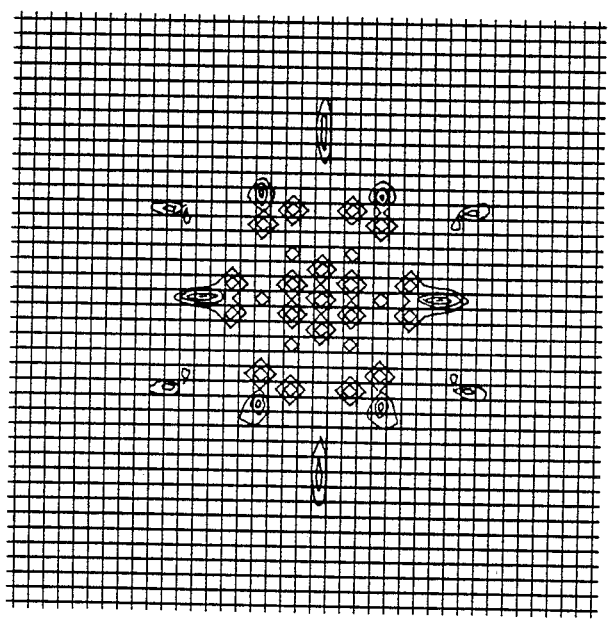

FIG. 16 is a schematic diagram of the two-dimensional distribution of the intensities of the diffused light in the sixth embodiment. The values of the factors in the above-defined conditions (6) to (12) for the numerical example of this embodiment are given in Table-1 below.

TABLE 1

| | |
|---|---|
| $0 \leq \rho < 0.2$ L: | N/M = 1/16 = 0.0625 |
| $0.2$ L $\leq \rho < 0.4$ L: | N/M = 6/16 = 0.375 |
| $0.4$ L $\leq \rho$: | N/M = 9/16 = 0.5625 |
| (Repetition Direction 1) | |
| $0 \leq \theta < 0.3\, \theta s$: | N/M = 3/16 = 0.1875 |
| $0.3\, \theta s \leq \theta < 0.7\, \theta s$: | N/M = 4/16 = 0.25 |
| $0.7\, \theta s \leq \theta < 1.1\, \theta s$: | N/M = 4/16 = 0.25 |
| $1.1\, \theta s \leq \theta$: | N/M = 5/16 = 0.3125 |
| (Repetition Direction 2) | |
| $0 \leq \theta < 0.3\, \theta s$: | N/M = 4/16 = 0.25 |
| $0.3\, \theta s \leq \theta < 0.7\, \theta s$: | N/M = 4/16 = 0.25 |
| $0.7\, \theta s \leq \theta < 1.1\, \theta s$: | N/M = 3/16 = 0.1875 |
| $1.1\, \theta s \leq \theta$: | N/M = 5/16 = 0.3125 |
| (Repetition Direction 3) | |
| $0 \leq \theta < 0.3\, \theta s$: | N/M = 5/16 = 0.3125 |
| $0.3\, \theta s \leq \theta < 0.7\, \theta s$: | N/M = 4/16 = 0.25 |
| $0.7\, \theta s \leq \theta < 1.1\, \theta s$: | N/M = 2/16 = 1.25 |
| $1.1\, \theta s \leq \theta$: | N/M = 5/16 = 0.3125 |

The values of the positions (in X and Y coordinates) and sizes (the radius R of circles) of the minute patterns in the sixth embodiment are listed in Table-3. All the values are based on the repetition period of the unit regions normalized to unity. The X-axis coincides with the direction 3 in FIG. 15 and the Y-axis is in the direction perpendicular to it with the original point of the coordinates in coincidence with the center $\mu$G.

In the seventh embodiment shown in FIG. 17, the unit region as determined by the virtual boundary lines in between it and any of its adjacent unit regions has a regular-hexagonal shape with its one side of 17 $\mu$m long. The number of directions in which the unit regions are repetitively arranged is three as indicated by directions 3, 4 and 5. The repetition pitch L and the average value $\theta s$ of angles of the repetition directions are set to:

L≈29.45 $\mu$m $\theta s$=60 degrees

Also, in the present embodiment, the shape of each of the minute patterns is circular. Of these minute patterns, the minimum one has a diameter of 3 $\mu$m and the maximum one has a diameter of 12 $\mu$m.

FIG. 18 is a schematic diagram of the two-dimensional distribution of the intensities of the diffused light. THe values of the factors of all the conditions for this embodiment are given in Table-2 below.

TABLE 2

| | |
|---|---|
| $0 \leq \rho < 0.2$ L: | N/M = 1/37 = 0.027 |
| $0.2$ L $\leq \rho < 0.4$ L: | N/M = 12/27 = 0.3243 |
| $0.4$ L $\leq \rho$: | N/M = 24/37 = 0.6486 |
| (Repetition Direction 1) | |
| $0 \leq \theta < 0.3\, \theta s$: | N/M = 7/27 = 0.1875 |
| $0.3\, \theta s \leq \theta < 0.7\, \theta s$: | N/M = 12/37 = 0.3243 |
| $0.7\, \theta s \leq \theta < 1.1\, \theta s$: | N/M = 10/37 = 0.2703 |
| $1.1\, \theta s \leq \theta$: | N/M = 8/37 = 0.2162 |
| (Repetition Direction 2) | |
| $0 \leq \theta < 0.3\, \theta s$: | N/M = 8/37 = 0.2162 |
| $0.3\, \theta s \leq \theta < 0.7\, \theta s$: | N/M = 12/37 = 0.3243 |
| $0.7\, \theta s \leq \theta < 1.1\, \theta s$: | N/M = 9/37 = 0.2432 |
| $1.1\, \theta s \leq \theta$: | N/M = 8/37 = 0.2162 |
| (Repetition Direction 3) | |
| $0 \leq \theta < 0.3\, \theta s$: | N/M = 5/37 = 0.1351 |
| $0.3\, \theta s \leq \theta < 0.7\, \theta s$: | N/M = 12/37 = 0.3243 |
| $0.7\, \theta s \leq \theta < 1.1\, \theta s$: | N/M = 11/37 = 0.2973 |
| $1.1\, \theta s \leq \theta$: | N/M = 9/37 = 0.2432 |

The positions (in X and Y coordinates) and the values of the size (the radii R of circles) of the minute patterns of the seventh embodiment are listed in Table-4. All the values are based on the repetition period of the unit regions normalized to unity. The X-axis is in the direction 3 in FIG. 17, and the Y-axis is in the direction perpendicular to it with the original point of the coordinates in coincidence with the cente $\mu$G.

The invention is not confined to the circular form of the minute patterns. It is to be understood that it is applicable to elliptical forms and any other forms.

TABLE 3

| No | X | Y | R |
|---|---|---|---|
| 1 | 0.000 | 0.000 | 0.202 |
| 2 | 0.081 | 0.427 | 0.075 |
| 3 | −0.104 | 0.416 | 0.075 |
| 4 | −0.407 | −0.139 | 0.075 |
| 5 | −0.312 | −0.292 | 0.075 |
| 6 | 0.413 | −0.136 | 0.075 |
| 7 | 0.315 | −0.286 | 0.075 |
| 8 | 0.312 | 0.055 | 0.084 |
| 9 | −0.315 | 0.052 | 0.084 |
| 10 | 0.107 | −0.300 | 0.084 |
| 11 | −0.202 | 0.242 | 0.084 |
| 12 | −0.107 | −0.300 | 0.084 |
| 13 | 0.205 | 0.242 | 0.084 |
| 14 | −0.401 | 0.228 | 0.084 |
| 15 | −0.003 | −0.465 | 0.084 |
| 16 | 0.401 | 0.237 | 0.084 |

TABLE 4

| No | X | Y | R |
|---|---|---|---|
| 1 | 0.000 | 0.000 | 0.204 |
| 2 | 0.000 | 0.577 | 0.085 |
| 3 | −0.499 | 0.289 | 0.085 |
| 4 | −0.499 | −0.289 | 0.085 |
| 5 | 0.000 | −0.577 | 0.085 |
| 6 | 0.499 | −0.289 | 0.085 |
| 7 | 0.499 | 0.289 | 0.085 |
| 8 | 0.173 | 0.302 | 0.068 |
| 9 | −0.153 | 0.265 | 0.068 |
| 10 | −0.350 | 0.003 | 0.068 |
| 11 | −0.153 | −0.268 | 0.068 |
| 12 | 0.173 | −0.302 | 0.068 |
| 13 | 0.312 | 0.000 | 0.068 |
| 14 | 0.098 | 0.438 | 0.051 |
| 15 | −0.085 | 0.414 | 0.051 |
| 16 | −0.333 | 0.272 | 0.051 |
| 17 | −0.414 | 0.143 | 0.051 |
| 18 | −0.404 | −0.136 | 0.051 |
| 19 | −0.333 | −0.306 | 0.051 |
| 20 | −0.082 | −0.418 | 0.051 |
| 21 | 0.095 | −0.442 | 0.051 |
| 22 | 0.329 | −0.295 | 0.051 |
| 23 | 0.428 | −0.132 | 0.051 |
| 24 | 0.421 | 0.129 | 0.051 |
| 25 | 0.333 | 0.302 | 0.051 |
| 26 | 0.251 | 0.431 | 0.051 |
| 27 | −0.251 | 0.431 | 0.051 |
| 28 | −0.499 | 0.000 | 0.051 |
| 29 | −0.251 | −0.431 | 0.051 |
| 30 | 0.251 | −0.431 | 0.051 |
| 31 | 0.499 | 0.000 | 0.051 |
| 32 | 0.251 | 0.143 | 0.051 |
| 33 | 0.003 | 0.302 | 0.051 |
| 34 | −0.251 | 0.143 | 0.051 |
| 35 | −0.265 | −0.163 | 0.051 |
| 36 | 0.000 | −0.289 | 0.051 |
| 37 | 0.268 | −0.156 | 0.051 |

Yet another feature of the invention is that on an optically transparent substrate a plurality of unit regions in each of which a plurality of minute patterns of a predetermined shape comprised of a convex portion and/or concave portion and made of the same material as that of the substrate are irregularly arranged. The unit regions are arranged at a repetition pitch L, wherein letting the maximum one and the minimum one of intervals P between centers of adjacent two minute patters when projected in arbitrary one of repetition directions of the unit regions be denoted by Pmax and Pmin, respectively, the following conditions are satisfied:

$$0 \leq Pmin \leq 0.05L \quad (13)$$

$$0.01L \leq Pmax \leq 0.5L \quad (14)$$

It should be noted in connection with the present embodiment that those of the minute patterns which lie across the virtual boundary line 11 between the adjacent two of the unit regions 10 are treated as being contained in both of these two unit regions.

Figure 19:
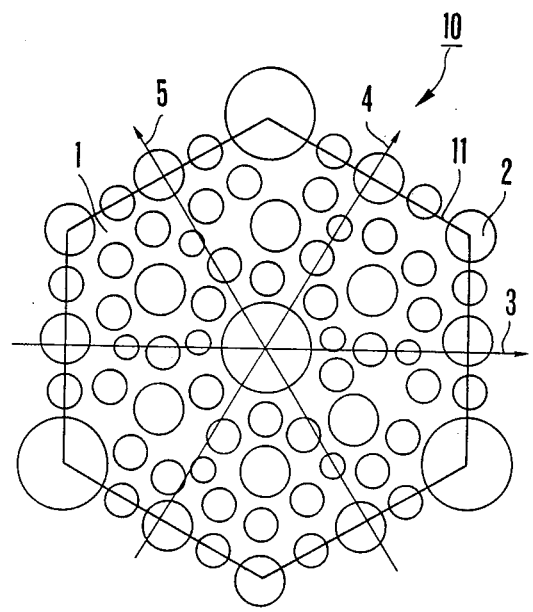
Figure 21:
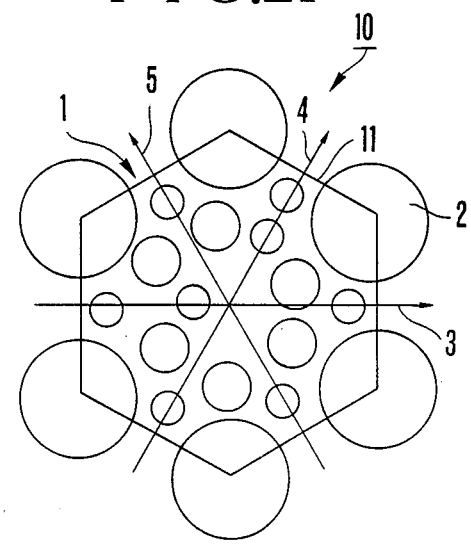

In the present embodiment, as shown in FIG. 19 and FIG. 21, an irregular array of a plurality of minute patterns 2 comprised of a convex portion or a concave portion are formed to circular shapes on a surface of the substrate 1, thereby constituting a unit region 10.

At this time, the unit regions 10 and the minute patterns contained in these unit regions are specified by satisfying the conditions (13) and (14). Thus, the proper effects as to the focusing screen are brought into full play.

Particularly in the phase-type focusing screen of the invention, on consideration of a finding that the periodicity of the statistical array of the minute patterns in the unit region largely controls the diffusion characteristic, the measure for arraying the minute patterns to obtain the optimum diffusion characteristic is expressed by numerical form as the above-described condition (14). When going out of the ranges of the conditions (13) and (14), either the diffusion expand to more than necessary, or they narrow, or the distribution of the intensity of light is distorted objectionably.

...of the invention is that letting a ...als P between centers of adjacent ...tterns be denoted by Pmean, the ...s satisfied:

$$\text{)/(Pmax} - \text{Pmin)} \leq 0.5 \quad (15)$$

is satisfied, a better diffusion char-
ined.
her improvement of the perfor-
screen, it is preferred to establish
'eristic that taking the direction
enters as a reference line, the
inuously distributed over a
6° on one side of the refer-
i the present embodiment,
patterns of different sizes
'gion, thereby making it
of less chromatic blur
blur feeling.
the repetition pitch
ι than 20 μm. This
fluence of similar
escribed before, 'using screens
ow.
FIG. 19, the
unit region
ilar hexagon
of directions
arranged is three as indicated by directions 3, 4 and 5. The repetition pitch L is:

$$L \approx 46.77 \ \mu m.$$

Also, each of the minute patterns in the present embodiment is of a circular form. Of these minute patterns, the minimum one has a diameter of 3 μm and the maximum one has a diameter of 10.4 μm.

Figure 20:
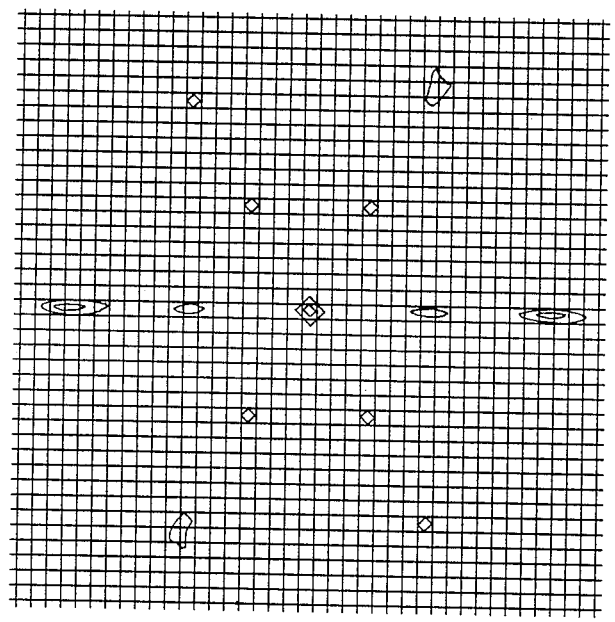

FIG. 20 is a schematic diagram of the two-dimensional distribution of the intensity of the diffused light of the eighth embodiment. The values of the factors of the before described conditions for this embodiment are listed in Table-5.

The coordinates (X, Y) of the positions and the values of the radii R of all the circular minute patterns in the unit region in the eighth embodiment are listed in Table-7. All the values are in terms of L normalized to unity. The original point of the coordinates lies at a center of gravity of a form of the (regular-hexagonal) unit region. The X-axis coincides with the repetition direction 3 in FIG. 19, and the Y-axis is a direction perpendicular to it.

TABLE 5

| (Repetition Direction 1) |
| --- |
| Pmax = 0.116 L, Pmin = 0, Pmean = 0.015 L |
| (Pmean-Pmin)/(Pmax-Pmin) = 0.13 |
| (Repetition Direction 2) |
| Pmax = 0.107 L, Pmin = 0, Pmean = 0.015 L |
| (Pmean-Pmin)/(Pmax-Pmin) = 0.14 |
| (Repetition Direction 3) |
| Pmax = 0.103 L, Pmin = 0, Pmean = 0.015 L |
| (Pmean-Pmin)/(Pmax-Pmin) = 0.15 |

TABLE 7

| No | X | Y | R |
| --- | --- | --- | --- |
| 1 | 0.000 | 0.000 | 0.111 |
| 2 | 0.130 | 0.124 | 0.043 |
| 3 | 0.000 | 0.177 | 0.043 |
| 4 | −0.137 | 0.113 | 0.043 |
| 5 | 0.019 | 0.304 | 0.064 |
| 6 | 0.124 | 0.381 | 0.043 |
| 7 | −0.053 | 0.411 | 0.043 |
| 8 | −0.148 | 0.353 | 0.043 |
| 9 | −0.263 | 0.152 | 0.064 |
| 10 | −0.184 | 0.261 | 0.032 |
| 11 | −0.101 | 0.210 | 0.043 |
| 12 | −0.282 | 0.297 | 0.043 |
| 13 | −0.374 | 0.216 | 0.043 |
| 14 | −0.265 | −0.154 | 0.064 |
| 15 | −0.163 | 0.017 | 0.032 |
| 16 | −0.344 | 0.000 | 0.032 |
| 17 | −0.139 | −0.113 | 0.043 |
| 18 | −0.252 | −0.015 | 0.043 |
| 19 | −0.385 | −0.098 | 0.043 |
| 20 | 0.000 | −0.310 | 0.064 |
| 21 | 0.096 | −0.220 | 0.043 |
| 22 | 0.000 | −0.175 | 0.043 |
| 23 | −0.096 | −0.216 | 0.043 |
| 24 | 0.220 | −0.180 | 0.064 |
| 25 | 0.351 | −0.004 | 0.032 |
| 26 | 0.160 | 0.032 | 0.032 |
| 27 | 0.389 | −0.092 | 0.043 |
| 28 | 0.257 | 0.004 | 0.043 |
| 29 | 0.169 | −0.062 | 0.043 |
| 30 | 0.259 | 0.143 | 0.064 |
| 31 | 0.182 | 0.304 | 0.032 |
| 32 | 0.374 | 0.216 | 0.043 |
| 33 | 0.280 | 0.289 | 0.043 |
| 34 | 0.120 | 0.229 | 0.043 |
| 35 | −0.265 | 0.428 | 0.064 |
| 36 | −0.154 | 0.490 | 0.043 |
| 37 | −0.500 | 0.289 | 0.064 |
| 38 | −0.376 | 0.361 | 0.043 |

TABLE 7-continued

| No | X | Y | R |
|---|---|---|---|
| 39 | −0.500 | 0.021 | 0.064 |
| 40 | −0.374 | 0.092 | 0.043 |
| 41 | −0.500 | 0.156 | 0.043 |
| 42 | −0.500 | −0.289 | 0.111 |
| 43 | −0.331 | −0.261 | 0.043 |
| 44 | −0.500 | −0.111 | 0.043 |
| 45 | −0.235 | −0.445 | 0.064 |
| 46 | −0.139 | −0.302 | 0.032 |
| 47 | −0.105 | −0.389 | 0.043 |
| 48 | −0.235 | −0.316 | 0.043 |
| 49 | −0.346 | −0.378 | 0.043 |
| 50 | 0.000 | −0.577 | 0.064 |
| 51 | 0.124 | −0.505 | 0.043 |
| 52 | 0.002 | −0.440 | 0.043 |
| 53 | −0.124 | −0.505 | 0.043 |
| 54 | 0.235 | −0.443 | 0.064 |
| 55 | 0.167 | −0.289 | 0.032 |
| 56 | 0.346 | −0.376 | 0.043 |
| 57 | 0.263 | −0.304 | 0.043 |
| 58 | 0.111 | −0.372 | 0.043 |
| 59 | 0.500 | −0.289 | 0.111 |
| 60 | 0.500 | −0.111 | 0.043 |
| 61 | 0.340 | −0.220 | 0.043 |
| 62 | 0.500 | 0.021 | 0.064 |
| 63 | 0.500 | 0.156 | 0.043 |
| 64 | 0.389 | 0.090 | 0.043 |
| 65 | 0.500 | 0.289 | 0.064 |
| 66 | 0.376 | 0.361 | 0.043 |
| 67 | 0.265 | 0.421 | 0.064 |
| 68 | 0.154 | 0.490 | 0.043 |
| 69 | 0.000 | 0.577 | 0.111 |

In the ninth embodiment shown in FIG. 21, the virtual boundary lines 11 between a given unit region and any of its adjacent unit regions define a regular hexagon whose one side is 15 μm long. There are three repetition directions in which the unit regions are repetitively arranged as indicated by directions 3, 4 and 5. The repetition pitch L is:

$$L \approx 25.98 \mu m.$$

Also, each of the minute patterns in the present embodiment is of a circular form. Of these minute patterns, the minimum one has a diameter of 3 μm, and the maximum one has a diameter of 10 μm.

Figure 22:
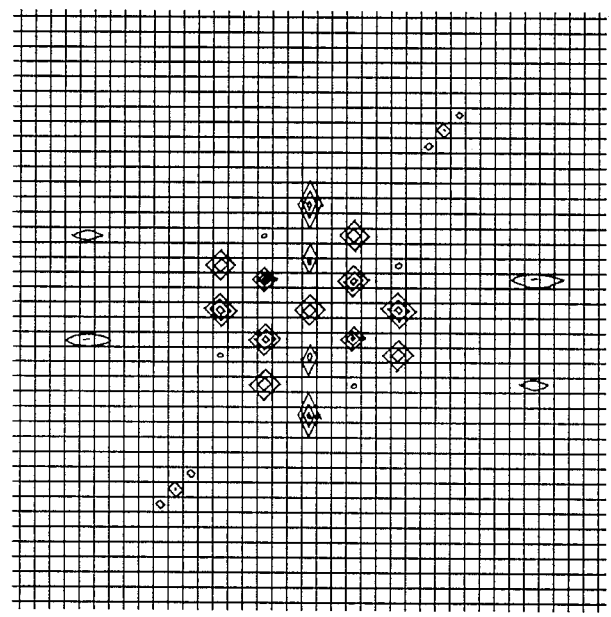

FIG. 22 is a schematic diagram of the two-dimensional distribution of the intensity of the diffused light of the ninth embodiment. The values of the factors in the before-described conditions for this embodiment are listed in Table-6.

The coordinates (X, Y) of the positions and the radii R of the circular minute patterns in the unit region in the ninth embodiment are listed in Table-8. All the values are in terms of L normalized to unity. The original point of the coordinates lies at a center of gravity of a form of the (regular-hexagonal) unit region. The X-axis coincides with the repetition direction 3 of FIG. 21, and the Y-axis is in a direction perpendicular to it.

TABLE 6

(Repetition Direction 1)
Pmax = 0.169 L, Pmin = 0.004 L, Pmean = 0.046 L
(Pmean-Pmin)/(Pmax-Pmin) = 0.25
(Repetition Direction 2)
Pmax = 0.162 L, Pmin = 0.004 L, Pmean = 0.055 L
(Pmean-Pmin)/(Pmax-Pmin) = 0.32
(Repetition Direction 3)
Pmax = 0.137 L, Pmin = 0, Pmean = 0.053 L
(Pmean-Pmin)/(Pmax-Pmin) = 0.39

TABLE 8

| No | X | Y | R |
|---|---|---|---|
| 1 | −0.216 | −0.162 | 0.081 |
| 2 | −0.012 | −0.289 | 0.081 |
| 3 | 0.219 | −0.139 | 0.081 |
| 4 | 0.227 | 0.062 | 0.081 |
| 5 | −0.042 | 0.254 | 0.081 |
| 6 | −0.239 | 0.142 | 0.081 |
| 7 | 0.185 | −0.323 | 0.058 |
| 8 | 0.396 | −0.019 | 0.058 |
| 9 | 0.131 | 0.216 | 0.058 |
| 10 | −0.200 | 0.331 | 0.058 |
| 11 | −0.115 | 0.012 | 0.058 |
| 12 | −0.204 | −0.343 | 0.058 |
| 13 | 0.473 | 0.262 | 0.192 |
| 14 | 0.000 | 0.577 | 0.192 |
| 15 | −0.527 | 0.262 | 0.192 |
| 16 | −0.500 | −0.289 | 0.192 |
| 17 | −0.027 | −0.604 | 0.192 |
| 18 | 0.500 | −0.289 | 0.192 |
| 19 | 0.200 | 0.362 | 0.058 |
| 20 | −0.408 | −0.012 | 0.058 |

The present invention is not confined to the hexagonal form of the unit region. It is to be understood that it is applicable to a square, and any other forms. Also, without confining to the circular form of the minute pattern, it is applicable to an elliptical form and any other forms.

According to the invention, as has been described above, by regularly locating a plurality of unit regions and properly setting the form of the minute patterns to be used in that unit region and other features, a phase-type focusing screen which enables observation of a finder image less susceptible to the influence of the diffraction owing to the wavelengths of light, having less chromatic blur and, when in out-of-focus state, giving a good blur feeling, can be achieved.

What is claimed is:

1. A focusing screen adapted to be disposed in a position of an image plane formed by a photographic lens, comprising:

a plurality of unit regions regularly arranged on a substrate, each of said plurality of unit regions having a plurality of minute patterns irregularly arranged and formed by convex portions or concave portions of several kinds of sizes, wherein said focusing screen satisfies the following conditions:

$$0 \leq \Delta SR \leq 0.30$$

$$0.01 \leq \Delta SP \leq 0.25$$

where $$\Delta SR = \left| \left( \sum_{i=1}^{ITL} SP(i) \right) / Su - 0.5 \right|$$

$$\Delta SP = (SPMAX - SPMIN)/SU$$

wherein SU is an area of each of said plurality of unit regions, ITL is the total number of said plurality of minute patterns in each of said plurality of unit regions, SPMAX and SPMIN are, respectively, areas of those of all said plurality of minute patterns in each of said plurality of unit regions which have the maximum and minimum spreads on a surface in an arrangement direction, and SP(i) is an area of the i-th one of said plurality of minute patterns in each of said plurality of unit regions on the surface in the arrangement direction.

2. A focusing screen according to claim 1, satisfying the following condition:

$$0.0004 \leq \overline{SP} \leq 0.8$$

where $$\text{where } SP = \left( (1/ITL) \left( \sum_{i=1}^{ITL} SP(i) \right) \right)(1/SU).$$

3. A focusing screen according to claim 1, satisfying the following conditions:

when $0 \leq \rho \leq 0.2L$, $0 \leq N/M \leq 0.3$,
when $0.2L \leq \rho \leq 0.4L$, $0.1 \leq N/M \leq 0.8$,
when $0.4L \leq \rho$, $0.2 \leq N/M \leq 0.9$,
when $0 \leq \theta < 0.3\theta s$, $0 \leq N/M \leq 0.6$,
when $0.3\theta s \leq \theta < 0.7\theta s$ $0.1 \leq N/M \leq 0.8$,
when $0.7\theta s \leq \theta < 1.1\theta s$, $0 \geq N/M \geq 0.7$, and
when $1.1\theta s \leq \theta$, $0 \geq N/M \geq 0.7$, where $\rho$ is a distance from a center of gravity of a figure formed by virtual boundary lines between adjacent two of said plurality of unit regions to a center of gravity of a figure on a surface of said substrate of one of said plurality of minute patterns, L is a repetition pitch of said plurality of unit regions, $\theta$ is one of angles which is smaller than 90° in absolute value made by a direction of said distance $\rho$ with arbitrary one of repetition directions of said plurality of unit regions, $\theta s$ is an average value of one of angles which is smaller than 90° in absolute value made by two of the repetition directions of said plurality of unit regions, M is the total number of said plurality of minute patterns contained in each of said plurality of unit regions, and N is the number of said plurality of minute patterns contained within a range defined by the distance $\rho$ and the angle $\theta$.

4. A focusing screen according to claim 1, wherein each of said plurality of unit regions has three or more kinds of minute patterns of different forms or sizes irregularly arranged therein.

5. A focusing screen according to claim 1, satisfying the following conditions:

$$0 \leq \text{Pmin} \leq 0.05L$$

$$0.01L \leq \text{Pmax} \leq 0.5L$$

where L is a repetition pitch at which said plurality of unit regions are repetitively arranged, and Pmax and Pmin are respectively the maximum one and the minimum one of intervals P between centers of adjacent two of said plurality of minute patterns when projected in arbitrary one of the repetition directions of said plurality of unit regions.

6. A focusing screen according to claim 4, satisfying the following conditions:

$$0.01 \leq (\text{Pmean} - \text{Pmin})/(\text{Pmax} - \text{Pmin}) \leq 0.5$$

where Pmean is a man value of the intervals P between centers of adjacent two of said plurality of minute patterns.

7. A focusing screen comprising:
a plurality of unit regions regularly arranged on a substrate, each of said plurality of unit regions being substantially similar in structure and having a plurality of minute patterns irregularly arranged and comprised of a convex or concave portion having at least a first form and size and a plurality of minute patterns irregularly arranged and comprised of a convex or concave portion having at least a second form and size,
wherein said focusing screen satisfies the following conditions:

$$0 \leq \Delta SR \leq 0.30$$

$$0.01 \leq \Delta SP \leq 0.25$$

where $$\Delta SR = \left| \left( \sum_{i=1}^{ITL} SP(i) \right)/Su - 0.5 \right|$$

$$\Delta SP = (SPMAX - SPMIN)/SU$$

where SU is an area of each of said plurality of unit regions, ITL is the total number of said plurality of minute patterns in each of said plurality of unit regions, SPMAX and SPMIN are, respectively, areas of those of all said plurality of minute patterns in each of said plurality of unit regions which have the maximum and minimum spreads on a surface in an arrangement direction, and SP(i) is an area of the i-th one of said plurality of minute patterns in each of said plurality of unit regions on the surface in the arrangement direction.

8. A focusing screen according to claim 7, satisfying the following conditions:

when $0 \leq \rho \leq 0.2L$, $0 \leq N/M \leq 0.3$,
when $0.2L \leq \rho \leq 0.4L$, $0.1 \leq N/M \leq 0.8$,
when $0.4L \leq \rho$, $0.2 \leq N/M \leq 0.9$,
when $0 \leq \theta < 0.3\theta s$, $0 \leq N/M \leq 0.6$,
when $0.3\theta s \leq \theta < 0.7\theta s$ $0.1 \leq N/M \leq 0.8$,
when $0.7\theta s \leq \theta < 1.1\theta s$, $0 \geq N/M \geq 0.7$, and
when $1.1\theta s \leq \theta$, $0 \geq N/M \geq 0.7$, where $\rho$ is a distance from a center of gravity of a figure formed by virtual boundary lines between adjacent two of said plurality of unit regions to a center of gravity of a figure on a surface of said substrate of one of said plurality of minute patterns, L is a repetition pitch of said plurality of unit regions, $\theta$ is one of angles which is smaller than 90° in absolute value made be a direction of said distance $\rho$ with arbitrary one of repetition directions of said plurality of unit regions, $\theta s$ is an average value of one of angles which is smaller than 90° in absolute value made by two of the repetition directions of said plurality of unit regions, M is the total number of said plurality of minute patterns contained in each of said plurality of unit regions, and N is the number of said plurality of minute patterns contained within a range defined by the distance $\rho$ and the angle $\theta$.

9. A focusing screen according to claim 7, satisfying the following condition:

$$0.0004 \leq \overline{SP} \leq 0.8$$

$$SP = \left( (1/TTL) \left( \sum_{i=1}^{ITL} SP(i) \right) \right) (1/SU).$$

10. A focusing screen according to claim 7, satisfying the following conditions:

when $SP(i)/SU \leq 0.025$, $0.1 \leq ISNO/ITL \leq 0.95$,
when $0.025 < SP(i)/SU \leq 0.05$, $0 \leq ISNO/ITL \leq 0.70$,
when $0.050 < SP(i)/SU \leq 0.100$, $0 \leq ISNO/ITL \leq 0.30$,
when $0.100 < SP(i)/SU$, $0 \leq ISNO/ITL \leq 0.20$; and $$0.4 \leq \left( \sum_{i=1}^{ITL} SP(i)/SU \leq 0.6 \right.$$

where INSO is the number of minute patterns in which SP(i)/SU satisifies one of the above ranges.

11. A focusing screen according to claim 7, satisfying the following conditions:

when $0 \leq \rho \leq 0.2L$, $0 \leq N/M \leq 0.3$,
when $0.2L \leq \rho \leq 0.4L$, $0.1 \leq N/M \leq 0.8$,
when $0.4L \leq \rho$, $0.2 \leq N/M \leq 0.9$,
when $0 \leq \theta < 0.3\theta s$, $0 \leq N/M \leq 0.6$,
when $0.3\theta s \leq \theta < 0.7\theta s$ $0.1 \leq N/M \leq 0.8$,
when $0.7\theta s \leq \theta < 1.1\theta s$, $0 \geq N/M \geq 0.7$, and
when $1.1\theta s \leq \theta$, $0 \geq N/M \geq 0.7$, where $\rho$ is a distance from a center of gravity of a figure formed by virtual boundary lines between adjacent two of said plurality of unit regions to a center of gravity of a figure on a surface of said substrate of one of said plurality of minute patterns, L is a repetition pitch of said plurality of unit regions, $\theta$ is one of angles which is smaller than 90 degrees in absolute value made by a direction of said distance $\rho$ with arbitrary one of repetition directions of said plurality of unit regions, $\theta s$ is an average value of one of angles which is smaller than 90 degrees in absolute value made by two of the repetition directions of said plurality of unit regions, M is the total number of said plurality of minute patterns contained in each of said plurality of unite regions, and N is the number of said plurality of unit regions, and N is the number of said plurality of minute patterns contained within a range defined by the distance and the angle $\theta$.

12. A focusing screen according to claim 7, wherein each of said plurality of unit regions has three or more kinds of minute patterns of different forms or sizes irregularly arranged therein.

13. A focusing screen according to claim 7, satisfying the following conditions:

$0 \leq Pmin \leq 0.05L$ $0.01L \leq Pmax \leq 0.5L$ where L is a repetition pitch at which said plurality of unit regions are repetitively arranged, and Pmax and Pmin are, respectively, the maximum one and the minimum one of intervals P between centers of adjacent two of said plurality of minute patterns when projected in arbitrary one of the repetition directions of said plurality of unit regions.

14. A focusing screen according to claim 13, satisfying the following conditions:

$0.01 \leq (Pmean - Pmin)/(Pmax - Pmin) \leq 0.5$ where Pmean is a mean value of the intervals P between centers of adjacent two of said plurality of minute patterns.

15. A focusing screen adapted to be disposed in a position of an image plane formed by a photographic lens, comprising:

a plurality of unit regions regularly arranged on a substrate, each of said plurality of unit regions having a plurality of minute patterns irregularly arranged and formed by convex portions or concave portions of several kinds of sizes, wherein said focusing screen satisfies the following conditions:

when $SP(i)/SU \leq 0.025$, $0.1 \leq ISNO/ITL \leq 0.95$,
when $0.025 < SP(i)/SU \leq 0.05$, $0 \leq ISNO/ITL \leq 0.70$,
when $0.050 < SP(i)/SU \leq 0.100$, $0 \leq ISNO/ITL \leq 0.30$,
when $0.100 < SP(i)/SU$, $0 \leq ISNO/ITL \leq 0.20$; and $$0.4 \leq \left( \sum_{i=1}^{ITL} SP(i)/SU \leq 0.6 \right.$$

where ISNO is the number of minute patterns in which SP(i)/Su satisfies one of the above ranges.

16. A focusing screen comprising:

a plurality of unit regions regularly arranged on a substrate, each of said plurality of unit regions being substantially similar in structure and having a plurality of minute patterns irregularly arranged and comprised of a convex or concave portion having at least a first form and size and a plurality of minute patterns irregularly arranged and comprises of a convex or concave portion having at least a second form and size, wherein the focusing screen satisfies the following conditions:

when $SP(i)/SU \leq 0.025$, $0.1 \leq ISNO/ITL \leq 0.95$,
when $0.025 < SP(i)/SU \leq 0.05$, $0 \leq ISNO/ITL \leq 0.70$,
when $0.050 < SP(i)/SU \leq 0.100$, $0 \leq ISNO/ITL \leq 0.30$,
when $0.100 < SP(i)/SU$, $0 \leq ISNO/ITL \leq 0.20$; and $$0.4 \leq \left( \sum_{i=1}^{ITL} SP(i)/SU \leq 0.6 \right.$$

where INSO is the number of minute patterns in which SP(i)/SU satisfies one of the above ranges.

* * * * *

UNITED STATES PATENT AND TRADEMARK OFFICE
CERTIFICATE OF CORRECTION

PATENT NO. : 4,982,214  Page 1 of 5
DATED : January 1, 1991
INVENTOR(S) : Hiroshi MATSUI It is certified that error appears in the above-identified patent and that said Letters Patent is hereby corrected as shown below:

COLUMN 1:

Line 32, "the" (second occurrence) should be deleted.
    Line 33, "patterns," should read --patterns--.

COLUMN 3:

Line 35, "$0.0004 \leq SP \leq 0.8 \quad\quad (3)$" should read

--$0.0004 \leq \overline{SP} \leq 0.8 \quad\quad (3)$--.

Line 37, "where SP" should read --where $\overline{SP}$--.

COLUMN 4:

Line 22, "regions" should read --regions (a repetition pitch), and--.

COLUMN 5:

Line 13, "tion (4) and (5)" should read --tions (4) and (5)--.
    Line 14, "a" should be deleted.

COLUMN 7:

Line 45, "applied" should be deleted.
    Line 68, "blur feeling" should read --blurred appearance--.

COLUMN 8:

Line 28, "unatured." should read --unnatural.--.

UNITED STATES PATENT AND TRADEMARK OFFICE
CERTIFICATE OF CORRECTION

PATENT NO. : 4,982,214
DATED : January 1, 1991
INVENTOR(S) : Hiroshi MATSUI

It is certified that error appears in the above-identified patent and that said Letters Patent is hereby corrected as shown below:

COLUMN 9:

Line 47, "THe" should read --The--.
    Table 2, "12/27" should read --12/37-- and "7/27" should read --7/37--.

COLUMN 10:

Line 6, "cente $\mu$G." should read --center $\mu$G.--.

COLUMN 11:

Line 3, "patters" should read --patterns--.
    Line 56, "blur feeling." should read --blurred appearance.--

COLUMN 12:

Line 13, "before described" should read --before-described--.

COLUMN 14:

Line 35, "blur feeling," should read --blurred appearance,--.

UNITED STATES PATENT AND TRADEMARK OFFICE
CERTIFICATE OF CORRECTION

PATENT NO. : 4,982,214    Page 3 of 5
DATED : January 1, 1991
INVENTOR(S) : Hiroshi MATSUI It is certified that error appears in the above-identified patent and that said Letters Patent is hereby corrected as shown below:

COLUMN 15:

Line 11, "where SP" should read --where $\overline{SP}$--.
Line 20, "0.7θs 0.1" should read --0.7θs, 0.1--.
Line 21, "0 ≥ N/M ≥ 0.7," should read --0 ≤ N/M ≤ 0.7,--.
Line 22, "0 ≥ N/M ≥ 0.7," should read --0 ≤ N/M ≤ 0.7,--.
Line 56, "claim 4," should read --claim 5,--.
Line 57, "conditions:" should read --condition:--.
Line 61, "man value" should read --mean value--.

COLUMN 16:

Line 38, "0.7θs 0.1" should read --0.7θs, 0.1--.
Line 39, "0 ≥ N/M ≥ 0.7," should read --0 ≤ N/M ≤ 0.7,--.
Line 40, "0 ≥ N/M ≥ 0.7," should read --0 ≤ N/M ≤ 0.7,--.

Line 66, "$SP = \left\{ (1/TTL) \left[ \sum_{i=1}^{ITL} SP(i) \right] \right\} (1/SU)$."

should read

--where $\overline{SP} = \left\{ (1/\overline{ITL}) \left[ \sum_{i=1}^{ITL} SP(i) \right] \right\} (1/SU)$.--

UNITED STATES PATENT AND TRADEMARK OFFICE
CERTIFICATE OF CORRECTION

PATENT NO. : 4,982,214

DATED : January 1, 1991

INVENTOR(S) : Hiroshi MATSUI

It is certified that error appears in the above-identified patent and that said Letters Patent is hereby corrected as shown below:

COLUMN 17:

Line 9, "$0.4 \leq \left[ \sum_{i=1}^{ITL} SP(i)/SU \leq 0.6 \right.$" should read --$0.4 \leq \left\{ \sum_{i=1}^{ITL} SP(i) \right\} /SU \leq 0.6$--.

Line 11, "INSO" should read --ISNO--.
Line 19, "0.7θs 0.1" should read --0.7θs, 0.1--.
Line 20, "$0 \geq N/M \geq 0.7$," should read --$0 \leq N/M \leq 0.7$,--.
Line 21, "$0 \geq N/M \geq 0.7$," should read --$0 \leq N/M \leq 0.7$,--.
Line 36, "write" should read --unit--.
Line 37, should be deleted.

COLUMN 18:

Line 6, "conditions:" should read --condition:--.

Line 27, "$0.4 \leq \left[ \sum_{i=1}^{ITL} SP(i)/SU \leq 0.6 \right.$" should read --$0.4 \leq \left\{ \sum_{i=1}^{ITL} SP(i) \right\} /SU \leq 0.6$--.

UNITED STATES PATENT AND TRADEMARK OFFICE
CERTIFICATE OF CORRECTION

PATENT NO. : 4,982,214
DATED : January 1, 1991
INVENTOR(S) : Hiroshi MATSUI

It is certified that error appears in the above-identified patent and that said Letters Patent is hereby corrected as shown below:

COLUMN 18 (Continued):

Line 30, "SP(i)/Su" should read --SP(i)/SU--.

Line 48, "$0.4 \leq \left[ \sum_{i=1}^{ITL} SP(i)/SU \leq 0.6 \right.$" should read --$0.4 \leq \left\{ \sum_{i=1}^{ITL} SP(i) \right\} /SU \leq 0.6$--.

Line 51, "INSO" should read --ISNO--.

Signed and Sealed this

Fifteenth Day of December, 1992

Attest:

DOUGLAS B. COMER

*Attesting Officer*     *Acting Commissioner of Patents and Trademarks*